(12) United States Patent
Bell et al.

(10) Patent No.: US 9,426,853 B2
(45) Date of Patent: Aug. 23, 2016

(54) LIGHTING MEANS INSERTION DETECTION

(71) Applicant: TRIDONIC GMBH & CO KG, Dornbirn (AT)

(72) Inventors: Wayne Bell, Durham (GB); Paul Dalby, Middlesbrough (GB); Deepak Makwana, Newcastle Upon Tyne (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/651,585

(22) PCT Filed: Dec. 19, 2013

(86) PCT No.: PCT/AT2013/000207
§ 371 (c)(1),
(2) Date: Jun. 11, 2015

(87) PCT Pub. No.: WO2014/094013
PCT Pub. Date: Jun. 26, 2014

(65) Prior Publication Data
US 2015/0312986 A1    Oct. 29, 2015

(30) Foreign Application Priority Data
Dec. 21, 2012   (DE) .................. 10 2012 224 200

(51) Int. Cl.
*H05B 37/02*     (2006.01)
*H05B 33/08*     (2006.01)

(52) U.S. Cl.
CPC ........ *H05B 33/0815* (2013.01); *H05B 33/0824* (2013.01); *H05B 33/0848* (2013.01); *Y02B 20/341* (2013.01); *Y02B 20/346* (2013.01); *Y02B 20/348* (2013.01)

(58) Field of Classification Search
CPC ............................... H05B 33/08; H05B 37/02
USPC ............. 315/209 R, 224–225, 247, 274, 276, 315/287, 291, 307, 308
See application file for complete search history.

(56) References Cited

U.S. PATENT DOCUMENTS

| 6,683,422 B1 | 1/2004 | Moyer | |
| 7,573,729 B2 * | 8/2009 | Elferich | H05B 33/0818 315/210 |
| 8,106,596 B2 * | 1/2012 | Chang | H05B 33/0818 315/209 R |

(Continued)

FOREIGN PATENT DOCUMENTS

| DE | 102006022819 A1 | 4/2007 |
| EP | 1791399 A1 | 5/2007 |

(Continued)

OTHER PUBLICATIONS

Anonymous: "AN-9729. LED Application Design Guide Using Half-Bridge LLC Resonant Converter for 100W Street Lighting", Internet Citation, Nov. 16, 2012. pp. 1-14, XP002707759, Retrieved from the Internet: URL:http:ffwww.fairchildsemi-comjan/AN/AN-9729.pdf [retrieved on Jul. 30, 2013].

*Primary Examiner* — Tung X Le
(74) *Attorney, Agent, or Firm* — Volpe and Koenig, P.C.

(57) ABSTRACT

In a first aspect, the invention provides an LED converter, comprising: a resonant converter with a switching regulator, preferably a clocked half-bridge converter, a galvanic barrier, the primary side of which being supplied by the switching regulator and the secondary side of which being arranged for providing directly or indirectly power to terminals for connecting one or more LEDs, a control circuit on the primary side of the galvanic barrier of the resonant converter, a sensing means on the secondary side of the galvanic barrier sensing a secondary side electric parameter indicative of an LED load, when connected to said terminals, a feedback path from the sensing means to the control circuit adapted to feedback the secondary side electric parameter from the secondary side of the galvanic barrier to the primary side of the galvanic barrier, wherein in case no LED string is connected to the LED converter, the control unit is adapted to cyclically control a switching frequency of switching regulator switches, in particular switches of the clocked half-bridge, from a high frequency to a lower frequency, and to monitor whether the secondary side electric parameter reaches a predetermined threshold value, and to, in case the predetermined threshold value is reached, deactivate the switching regulator switches and to activate a voltage protection switch to pull the secondary side electric parameter to ground.

14 Claims, 3 Drawing Sheets

(56) References Cited

U.S. PATENT DOCUMENTS

| | | | | |
|---|---|---|---|---|
| 8,853,957 | B2 * | 10/2014 | Ge | H05B 33/0815 315/247 |
| 2007/0024254 | A1 | 2/2007 | Radecker et al. | |
| 2012/0025720 | A1 * | 2/2012 | Chen | H02M 3/337 315/185 R |
| 2012/0293072 | A1 | 11/2012 | Chang et al. | |
| 2013/0271040 | A1 * | 10/2013 | Chen | H05B 33/0815 315/307 |
| 2014/0176008 | A1 * | 6/2014 | Harish Gopala Pillai | H05B 33/0809 315/291 |

FOREIGN PATENT DOCUMENTS

| | | |
|---|---|---|
| JP | 2011048985 A | 3/2011 |
| WO | 2009147563 A2 | 12/2009 |
| WO | 2011039678 A1 | 4/2011 |

* cited by examiner

LIGHTING MEANS INSERTION DETECTION

The invention relates to a LED converter and a method for operating such a converter, to a LED lighting means comprising the LED converter. The invention also relates to an integrated circuit adapted to perform the method.

LED converters using resonant converters such as LLC converters are known in the art and for example are widely used for cost-efficient LED converter solutions. In particular, a LED converter can be supplied from an electric supply source, which may deliver a DC or an AC current to the LED converter. In case of an AC current being supplied, the LED converter may comprise a rectifier to produce a DC current from the input AC current.

The DC current is then fed, for example, to a power factor correction circuit, which then supplies a resonant converter, e.g. a series resonant converter, in particular a LLC converter. A transformer connected to or being part of the resonant converter then transfers power over a galvanic barrier, e.g. a SELV barrier (separated or safety extra low voltage barrier), from a primary side of the galvanic barrier to a secondary side of the galvanic barrier to supply a current $I_{LED}$ to a light source, in particular an LED string comprising at least one LED.

In most of the known applications, LLC converters serve as a constant voltage converter, which supply a secondary side DC bus. There, a current source, typically a buck converter, generates the constant current that is required to drive high power LEDs. As known to the skilled persons, a LLC converter is a resonant half-bridge converter that uses two inductors (LL) and a capacitor (C).

The general advantage of using an LLC converter is that it provides a soft switching capability (primary switches as well as secondary side diodes) and a good load rejection ratio, i.e. the output voltage does not vary much if the secondary load changes.

In order to reduce the costs and to improve the efficiency of LED converters, especially when using LLC converters, it would be beneficial if the secondary side current source would not be required. It would be especially desirable to operate the LLC converter as a constant current converter instead of a constant voltage converter. However, an LLC constant current converter requires a control loop to control its output current, e.g. the LED current $I_{LED}$.

Figure 1:
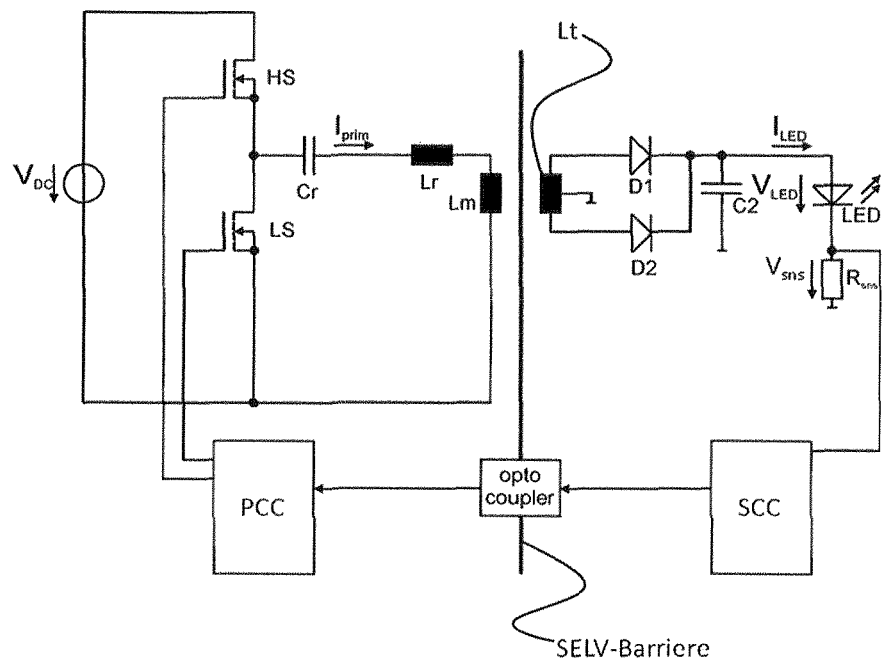

For example, FIG. 1 shows an exemplary circuit, which allows to measure an LED current on the secondary side of a SELV barrier, i.e. the secondary side of a galvanic barrier, and to provide a feedback to the primary side of the galvanic barrier.

In particular, FIG. 1 shows a switching regulator, e.g. a half bridge converter, supplied from a DC voltage $V_{DC}$ with a high switch HS and a low switch LS connected in a half bridge. The switches of the half bridge can be transistors, e.g. FETs or MOSFETs.

From a midpoint between the half bridge switches HS, LS an LLC series is connected with capacity Cr followed by an inductivity Lr (forming a resonant LC circuit) and the primary side inductivity Lm of the transformer.

On the secondary side, the secondary side inductivity Lt of the transformer is shown connected to diodes D1 and D2 providing a DC LED current $I_{LED}$ to the lighting means, in this case the LED. The LED current $I_{LED}$ is shunt to ground via shunt resistor $R_{sns}$.

A secondary side control circuit SCC senses/measures a voltage $V_{sns}$ at the shunt resistor $R_{sns}$ and feeds back the voltage $V_{sns}$ or a parameter indicative of the measured voltage to a primary side control circuit PCC via an optocoupler. The primary side control circuit PCC then sets the frequency for activating the switches HS, LS. The voltage $V_{sns}$ is an electric parameter also indicative and correlated to the LED current $I_{LED}$ and hence from the voltage $V_{sns}$ the LED current $I_{LED}$ or another correlated electric parameter can be derived. Based on the feedback, the primary side control circuit PCC adjusts the frequency of the half bridge switches of the resonant converter.

As can be seen from FIG. 1, the closed loop control requires provision of the secondary side control circuit SCC and also a feedback path for the electric parameter crossing the galvanic barrier (SELV barrier) to allow the control of the LED current $I_{LED}$ by the primary side control circuit PCC. While the required measurement of the electric parameter is performed on the secondary side, it is also possible to use a primary side sensing to obtain an electric parameter required for controlling the LED current $I_{LED}$.

Figure 2:
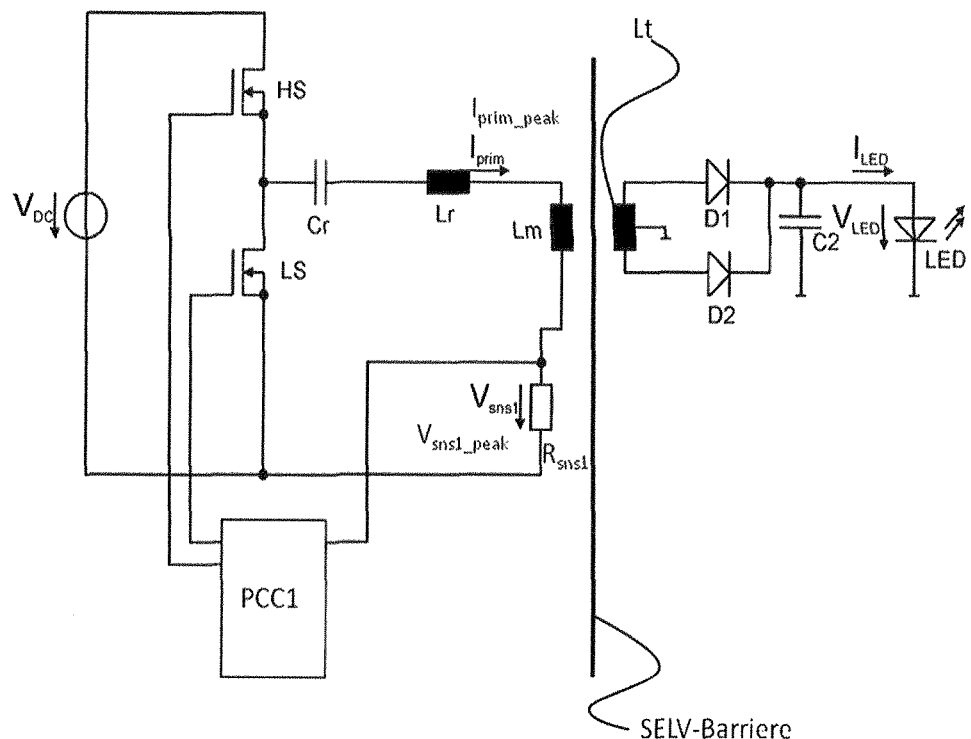

As shown in the exemplary circuit of FIG. 2, a current $I_{prim}$ of the resonant converter can be measured on the primary side of the galvanic barrier to set an operating frequency of the resonant converter half bridge.

FIG. 2 shows that on the secondary side of the galvanic barrier no shunt resistor is provided, and also neither a measurement is performed on the secondary side nor is a secondary side control circuit SCC present.

While the primary side of the resonant converter is in principle set up as described for FIG. 1, a shunt resistor $R_{sns1}$ is connected in series, with the primary side inductivity Lm of the transformer. A primary side control circuit PCC1 measures/senses an electric parameter, e.g., the shunt voltage $V_{sns1}$, which is indicative of the resonant converter $I_{prim}$. The primary side control circuit PCC1 sets the switching frequency of switches HS, LS of the resonant converter half bridge based on the measured electric parameter, which correlates to the resonant converter current $I_{prim}$.

This setup allows creating a control loop only on the primary side of the galvanic barrier and, for example, no feedback is required over the galvanic barrier (SELV barrier), which improves circuit safety.

The primary side control circuit PCC1 measures the voltage $V_{sns1}$ at the primary side winding, represented by the primary side inductivity $L_m$, of the transformer and, in particular, if the relation between the resonant converter current $I_{prim}$ and the LED current $I_{LED}$ is known, the LED current $I_{LED}$ can be controlled by adjusting the switching frequency of the high switch HS and the low switch LS based on the measured shunt voltage $V_{sns1}$.

This primary side sensing, in view of the secondary side sensing, improves the costs of the LED converter as no secondary side control circuit is required and also no crossing of the galvanic barrier is needed, which saves the costs for additional components, for example optocouplers. Further, if dimming commands should be executed, either through dimming signals signaled over the mains supply, an analog interface or a digital interface (e.g. DALI), the primary side sensing is beneficial as the dimming commands are typically received on the primary side of the LED converter.

The resonant converter shown in FIG. 2, however has a major disadvantage: As a resonant converter is used as a current source, when no load is connected on the output terminals on the secondary side of the galvanic barrier, i.e. no lighting means/LED is connected, the voltage in the resonant converter will rise to a level greater than specified for an operation of the resonant converter. In result, SELV safety requirements cannot be met.

To prevent high voltages in the resonant converter, the half bridge of the switching regulator could be stopped, which means that the switches HS, LS of the half bridge (e.g. FETS, MOS-FETS) are stopped. However, when the half bridge is stopped to prevent excessive voltages, there is also no power transferred from the primary side of the galvanic barrier to the secondary side by the transformer and hence the secondary side systems are cut-off and cannot be operated. On the other hand, if no power is transferred to the secondary side, also a detection of a connection of a lighting means/LED to secondary side terminals is not possible.

The invention provides a solution to this dilemma as outlined in the independent claims. Further aspects of the invention are subject to the dependent claims.

In a one aspect, the invention provides an LED converter, comprising: a resonant converter with a switching regulator, preferably a clocked half-bride converter, a galvanic barrier, the primary side of which being supplied by the switching regulator and the secondary side of which being arranged for providing directly or indirectly power to terminals for connecting one or more LEDs, a control circuit on the primary side of the galvanic barrier of the resonant converter, a sensing means on the secondary side of the galvanic barrier sensing a secondary side electric parameter indicative of an LED load, when connected to said terminals, a feedback path from the sensing means to the control circuit adapted to feedback the secondary side electric parameter from the secondary side of the galvanic barrier to the primary side of the galvanic barrier, wherein in case no LED string is connected to the LED converter, the control unit is adapted to cyclically control a switching frequency of switching regulator switches, in particular switches of the clocked half-bridge, from a high frequency to a lower frequency, and to monitor whether the secondary side electric parameter reaches a predetermined threshold value, and to, in case the predetermined threshold value is reached, deactivate the switching regulator switches and to activate a voltage protection switch to pull the secondary side electric parameter to ground.

The control circuit can be adapted to detect that an LED string is connected when during the controlling of the frequency from the high frequency to the low frequency the secondary side electric parameter does not reach the threshold value.

The resonant converter can be a series resonant converter, preferably an LLC converter, comprising an LC circuit, to which a primary side inductivity of a transformer and at least one of a shunt resistor, a diode in forward or reverse direction or a capacity is connected in series.

The control circuit may be configured to sense a primary side electric parameter, e.g. at least one of a shunt resistor, a diode or a capacity, the primary side electric parameter being indicative of an connected LED string draining current.

When the primary side electric parameter is detected or reaches a second predefined threshold, only the primary side electric parameter can be used to control the switching frequency of the switching regulator by the control circuit. The first and/or the second threshold can be stored in the primary side control circuit.

The feedback path may comprise an optocoupler or a high ohmic resistor.

The control circuit can detect that an LED string is connected, when the control circuit detects the primary side electric parameter while decreasing the frequency from the high frequency to the low frequency.

The control circuit may be an IC, ASIC and/or a microcontroller.

The lower frequency may be the resonant frequency of the resonant converter.

In another aspect, the invention provides a LED lighting means, comprising at least one LED supplied by a LED converter according to any of the preceding claims.

In yet another aspect, the invention provides a method for providing power to a LED string with at least one LED, comprising the steps of: supplying by a switching regulator the primary side of a galvanic barrier and providing directly or indirectly power to the LED string by a secondary side of the galvanic barrier, sensing by a sensing means on a secondary side of the galvanic barrier a secondary side electric parameter indicative of an LED string load, feedback the secondary side electric parameter from the secondary side of the galvanic barrier to the primary side of the galvanic barrier to a control circuit, in case no LED string is connected to the LED converter, cyclically controlling a switching frequency of switching regulator switches, in particular switches of the clocked half-bridge, from a high frequency to a lower frequency, to detect whether the secondary side electric parameter reaches a predetermined threshold value, and, in case the predetermined threshold value is reached, deactivating switching regulator switches and activating a voltage protection switch to pull the secondary side electric parameter to ground.

The method can furthermore comprise the step of detecting that an LED string is connected when during the controlling of the frequency from the high frequency to the low frequency the secondary side electric parameter does not reach the threshold value.

In still another aspect, the invention provides an integrated circuit, such as e.g. an ASIC or a microcontroller, arrange to support or perform a method according as described above.

Figure 3:
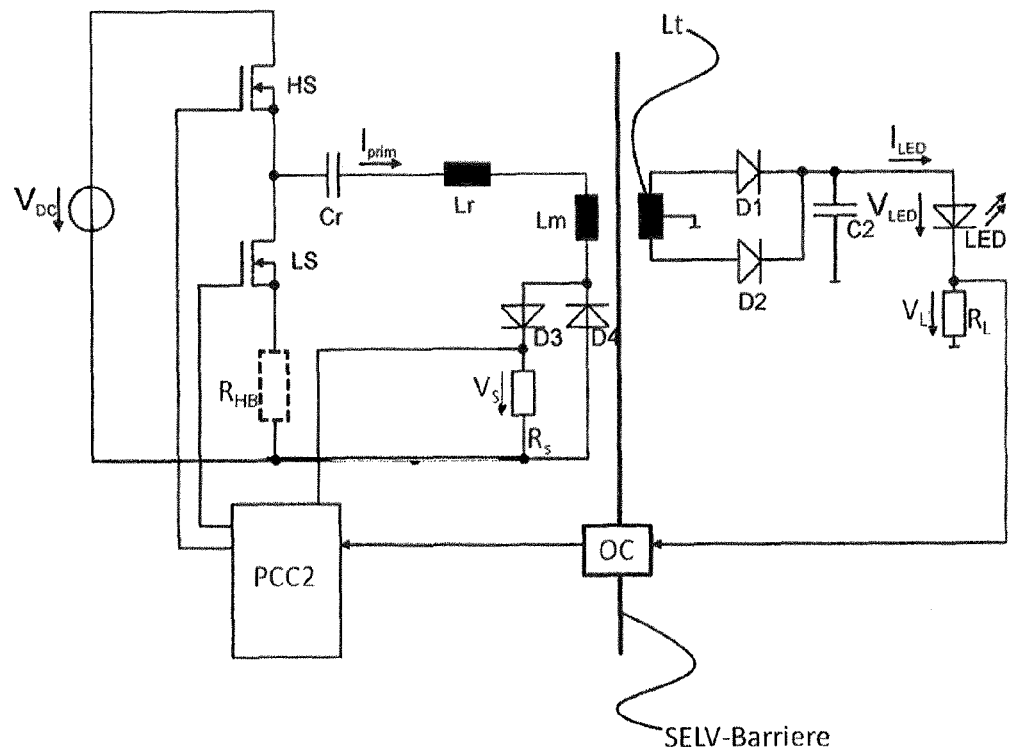
Figure 4:
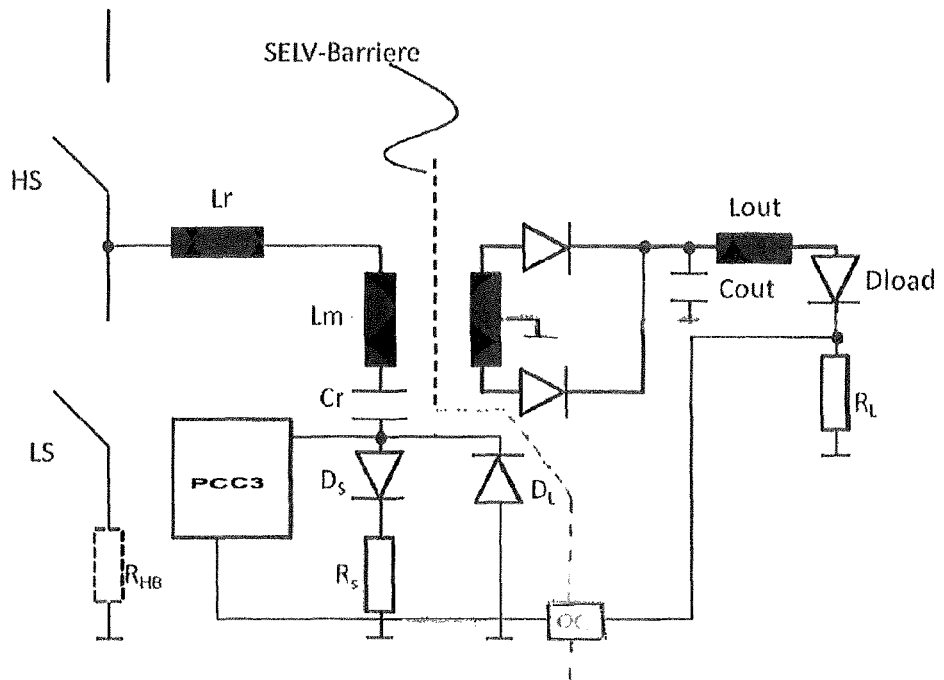

In the following, the invention is also described in view of the figures. In particular, FIG. 1 shows a know LLC converter using secondary side sensing;

FIG. 2 shows also a known LLC with primary sensing using a peak current control principle;

FIG. 3 exemplarily shows a circuit according to the invention;

FIG. 4 exemplarily shows an alternative circuit according to the invention;

FIGS. 5a-e show schematic diagrams illustrating a testing and detection sequence provided by the invention.

The invention hence in a first aspect provides a testing and detection method, which is preferably executed after each net reset, for example after power supply is cut-off from the LED converter. Generally it is always executed, when a secondary side electric parameter reaches a predetermined threshold, e.g. an over voltage protection threshold is reached by a secondary side sensed voltage, as follows:

In contrast to the prior art, the invention provides to operate the half bridge of the switching converter in a burst mode to pass energy to the secondary side of the galvanic barrier and to limit the voltage resulting from an open circuit on the secondary side, i.e. when no lighting means is connected. When the half bridge is operated in the burst mode, a signal can be generated, which can be used to detect when a lighting means is connected to the LED converter or the resonant converter, respectively.

Therefore, a switching frequency of the half bridge switches LS, HS is swept from a high to a low frequency, which means that starting from a high frequency, the switching frequency of the half bridge switches is continuously decreased over a specified time until the low frequency is reached. When no lighting means is connected, the output voltage of the resonant converter on the secondary side will raise to a predefined first threshold (the over voltage protection threshold).

If the output voltage reaches the first threshold, this is detected by the primary side control circuit PCC2 and the primary side control circuit PCC2 will stop the switches HS, LS of the half bridge and activates another switch, an over voltage protection switch, to pull the output voltage to ground. This testing sequence is cyclically repeated while no lighting means is connected to the secondary side terminals.

When a lighting means is connected, the lighting means clamps the output voltage and hence a connection of the lighting means can be detected by the primary side control circuit PCC2 as the predefined threshold value is not reached by the output voltage of the resonant converter.

In a relatively simple, and relatively cheap LED converter, a DC current is supplied to a power converter (PC, PFC), which again supplies a resonant converter, for example an LLC converter, with a switching regulator, preferably a clocked half-bridge converter.

The output of the resonant converter, which is separated from the lighting means by the galvanic barrier then transfers power to the secondary side, especially by a transformer, and, without a further converter (especially without a buck converter) to the lighting means/LED string. The resonant converter is preferably operated as a constant current source.

The invention is now described in more detail in view of FIG. 3. Only differences to the outlined prior art are discussed. Using only the primary side control circuit PCC2, it is a challenge to detect whether a lighting means/LED is connected on the secondary side of the resonant converter, as no feedback is generally provided from the secondary side, as shown in FIG. 2.

The half bridge of the resonant converter is operated with a relatively high frequency, a frequency higher than the resonant frequency of the serial resonant circuit of the LLC converter. The frequency is then in a plurality of steps or continuously decreased in direction of the resonant frequency.

At the same time, the voltage at the secondary side of the resonant converter is detected at a shunt resistor $R_L$.

If the detection/sensing at the shunt resistor $R_L$ indicates that the (indirectly) detected current/voltage reaches the predefined first threshold, the half bridge is disabled, i.e. the switches LS, HS are not operated.

Afterwards, in the following cycle, the switches of the half bridge again operate with a half frequency above the resonant frequency.

Hence, when the it is recognized by the control circuit that the first threshold is reached, i.e. when an over voltage, a voltage exceeding the predetermined first threshold value, the test, and detection sequence is used, i.e. a burst mode sequence is periodically repeated to detect whether a lighting means/LED is connected at a later point in time.

When a lighting means/LED string is connected, the detected current/voltage does not reach or exceed the predetermined first threshold value.

The voltage is detected on the secondary side of and is then fed back to the primary side control circuit PCC2. Therefore, the output voltage or a parameter indicative of the output voltage is fed back over the SELV barrier, for example using an optocoupler or a high Ohmic resistor.

Further, on the primary side, a second shunt resistor $R_S$ is connected in between ground and the serious resonant circuit established by the resonant LC circuit formed by resonant capacity Cr and resonant inductivity Lr and the primary side inductivity Lm of the transformer.

At the second shunt resistor $R_S$, it is indirectly detected on the primary side, whether an LED/lighting means drains current. If this is the case, the resulting primary side electric parameter, a primary side current $I_{prim}$ or a voltage $V_S$, is used for regulation of the LED/lighting means current, as this parameter is correlated to the LED current $I_{LED}$. In case a current drain is detected, the primary side control circuit PCC2 (IC, ASIC, microcontroller) only uses the signal to control the operation frequency of the half bridge switches instead of the secondary side electric parameter supplied from the secondary side of the resonant converter.

Hence, when in the test and detection sequence during decreasing of the half bridge operating frequency the primary side electric parameter, a current or voltage value or indication thereof, is detected, it serves as an indicator for a current through the lighting means/LED string. The detection may be facilitated by detecting whether the primary side electric parameter reaches a second threshold value. The primary side control circuit PCC2 regulates the half bridge operating frequency based on this closed loop regulation, using the primary side electric parameter detected at the second shunt resistor $R_S$.

FIG. 4 shows an alternative inventive circuit schematic of the resonant converter.

In particular, the half bridge of the resonant converter, the LLC converter, is shown with a high potential switch HS and a low potential switch LS. At a midpoint of the half bridge, the resonant inductivity Lr is connected in series with a primary inductivity Lm of the transformer, a resonant capacity Cr, an optional diode $D_S$ and the second shunt resistor $R_S$. Between the lower potential switch of the half bridge LS and ground a protective resistor $R_{HB}$ can be connected to protect the switches of the half bridge from high currents. This protective resistor $R_{HB}$ is optional and only shown in dashed lines in FIGS. 3 and 4.

On the secondary side of the resonant converter, the secondary inductivity Lt is shown with two diodes D1 and D2 supplying a constant current to a capacity Cout and further inductivity Lout to supply the load (lighting means/LED) Dload. The load is connected in serious with the shunt resistor $R_L$, at which the voltage Vload through the load is sensed at the shunt resistor $R_L$ and the voltage Vsense at in the resonant circuit is sensed at the second shunt resistor $R_S$. A primary side control circuit PCC3 senses the voltage Vload through the load indicative of the load current $I_{LED}$, which can alternatively be sensed, and the voltage Vsense at the resonant circuit, indicative of the primary side current $I_{prim}$, which can alternatively be sensed. Of course, electric parameters can be supplied to the primary side control circuit PCC3, which performs the testing and detection sequence described above.

The feedback path is provided from the shunt resistor $R_L$ back to the primary side control circuit PCC3. The feedback path crosses the galvanic barrier/SLV-barrier using an optocoupler OC or a high Ohmic resistor as required by SELV standards.

It should be understood that while a current/voltage can be detected at shunt resistor $R_L$ and the second shunt resistor $R_S$, also electric parameters of the respective voltage/current can be supplied to the primary side control PCC3.

Figure 5:
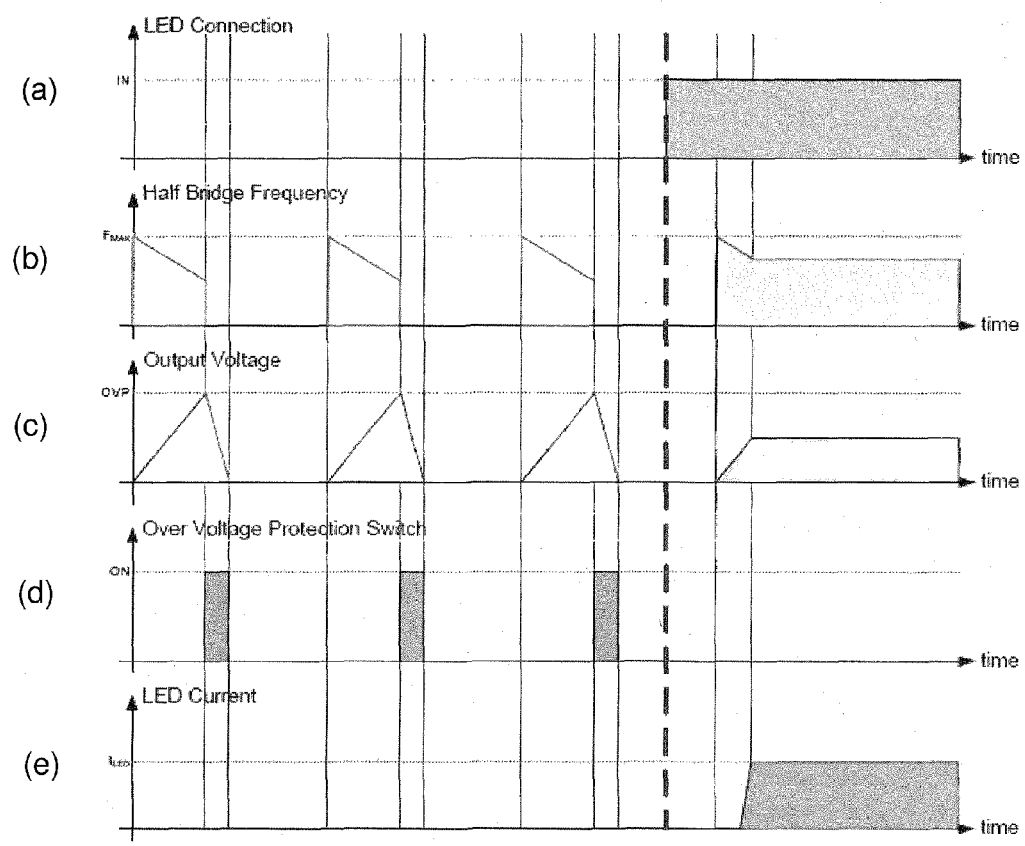

FIGS. 5a-e show diagrams illustrating the testing and detecting sequence provided by the invention. As can be seen from FIG. 5a, a lighting means/LED is connected to the LED Converter. This occurs at the time marked with the bold dashed line and is illustrated by the curve of FIG. 5a jumping to the value marked as IN.

During the time when no lighting means is connected, i.e. the time shown before the bold dashed line, FIG. 5b shows how the half bridge frequency is decreased from a high frequency marked with $F_{max}$ to a lower frequency, in particular the resonant frequency. The decreasing of the frequency from the high frequency $F_{max}$ to the lower frequency is stopped as soon as a maximum output voltage OVP is reached on the secondary side as shown in FIG. 5c.

If this is the case, a over voltage protection switch is activated to pull the output voltage to ground as shown in FIG. 5d. The over voltage protection switch is hence operative for a specified time period. The over voltage protection switch is preferably arranged on the secondary side, e.g. in parallel to the capacity Cout or the load (lighting means/LED) Dload.

As soon as an LED current $I_{led}$ is detected, and hence the connection of the a lighting means, on the secondary side by the primary side control circuit PCC3 as shown in FIG. 5e, the frequency of the half bridge switches HS, LS is no longer decreased (FIG. 5b) and as a further result, the output voltage does not reach the predetermined first threshold value OVP anymore.

The invention hence allows reliably supplying the secondary side of the resonant converter with power, but also allows detection of a lighting means connection on the secondary side.

The invention claimed is:

1. An LED converter, comprising:
   a resonant converter with a switching regulator, which is a clocked half-bridge converter,
   a galvanic barrier, a primary side of which being supplied by the switching regulator and a secondary side of which being arranged for providing directly or indirectly power to terminals for connecting one or more LEDs,
   a control circuit on the primary side of the galvanic barrier of the resonant converter,
   a sensing means on the secondary side of the galvanic barrier sensing a secondary side electric parameter, indicative of an LED load, when connected to said terminals, and
   a feedback path from the sensing means to the control circuit adapted to feedback the secondary side electric parameter from the secondary side of the galvanic barrier to the primary side of the galvanic barrier, wherein in case no LED string is connected to the LED converter, the control unit is adapted to cyclically control a switching frequency of switching regulator switches of the clocked half-bridge, from a high frequency to a lower frequency, and to monitor whether the secondary side electric parameter reaches a predetermined threshold value.

2. The LED converter of claim 1, wherein the control unit is adapted to, in case the predetermined threshold value is reached, deactivate the switching regulator switches and to activate a voltage protection switch to pull the secondary side electric parameter to ground.

3. The LED converter of claim 1, wherein the control circuit being adapted to detect that an LED string is connected when during the controlling of the frequency from the high frequency to the low frequency the secondary side electric parameter does not reach the threshold value.

4. The LED converter according to claim 1, wherein the resonant converter is an LLC converter, comprising an LC-circuit, to which a primary side inductivity of a transformer and at least one of a shunt resistor, a diode in forward or reverse direction or a capacity is connected in series.

5. The LED converter according to claim 1, wherein the control circuit is configured to sense a primary side electric parameter, the primary side electric parameter being indicative of a connected LED string draining current.

6. The LED converter according to claim 5, wherein, when the primary side electric parameter is detected or reaches a second predefined threshold, only the primary side electric parameter is used to control the switching frequency of the switching regulator by the control circuit.

7. The LED converter according to claim 5, wherein the control circuit detects that an LED string is connected, when the control circuit detects the primary side electric parameter while decreasing the frequency from the high frequency to the low frequency.

8. The LED converter according to claim 1, wherein the feedback path comprises an optocoupler or a high Ohmic resistor.

9. The LED converter according to claim 1, wherein the control circuit is an IC, ASIC and/or a microcontroller.

10. The LED converter of claim 1, wherein the lower frequency is the resonant frequency of the resonant converter.

11. A LED lighting means, comprising at least one LED supplied by a LED converter according to claim 1.

12. A method for providing power to a LED string with at least one LED, comprising the steps of:
   supplying by a switching regulator the primary side of a galvanic barrier and providing directly or indirectly power to the LED string by a secondary side of the galvanic barrier,
   sensing by a sensing means on a secondary side of the galvanic barrier a secondary side electric parameter indicative of an LED string load, and
   feedback the secondary side electric parameter from the secondary side of the galvanic barrier to the primary side of the galvanic barrier to a control circuit, wherein in case no LED string is connected to the LED converter, cyclically controlling a switching frequency of switching regulator switches of a clocked half-bridge, from a high frequency to a lower frequency, to detect whether the secondary side electric parameter reaches a predetermined threshold value, and, in case the predetermined threshold value is reached, deactivating switching regulator switches and activating a voltage protection switch to pull the secondary side electric parameter to ground.

13. The method of claim 12, further comprising the step of: detecting that an LED string is connected when during the controlling of the frequency from the high frequency to the low frequency the secondary side electric parameter does not reach the threshold value.

14. An integrated circuit arranged to support or perform the method according to claim 12.

* * * * *